US008014723B2

(12) United States Patent
Batey, Jr. et al.

(10) Patent No.: US 8,014,723 B2
(45) Date of Patent: *Sep. 6, 2011

(54) WIRELESS TRANSCEIVER AND METHOD FOR USE THEREWITH

(75) Inventors: Charles Edward Batey, Jr., Austin, TX (US); William Franklin Dunn, Jr., Austin, TX (US); Matthew Brady Henson, Austin, TX (US); Anna M. Worthy, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 679 days.

This patent is subject to a terminal disclaimer.

(21) Appl. No.: 11/728,193

(22) Filed: Mar. 23, 2007

(65) Prior Publication Data

US 2008/0232430 A1    Sep. 25, 2008

(51) Int. Cl.
*H04B 7/00* (2006.01)
*H04M 1/00* (2006.01)
(52) U.S. Cl. ................................. 455/41.2; 455/556.1
(58) Field of Classification Search ............... 455/41.2; 375/354
See application file for complete search history.

(56) References Cited

U.S. PATENT DOCUMENTS

| | | | |
|---|---|---|---|
| 6,326,926 B1 | 12/2001 | Shoobridge et al. | |
| 6,392,486 B1* | 5/2002 | Lemay, Jr. | 330/253 |
| 7,020,456 B2* | 3/2006 | Smeets et al. | 455/411 |
| 7,216,231 B2 | 5/2007 | Gehrmann | |
| 7,352,997 B2* | 4/2008 | Torvinen | 455/41.2 |
| 2003/0054788 A1 | 3/2003 | Sugar et al. | |
| 2004/0132500 A1 | 7/2004 | Rogalski et al. | |
| 2004/0212399 A1* | 10/2004 | Mulligan et al. | 326/90 |
| 2005/0014468 A1 | 1/2005 | Salokannel et al. | |
| 2005/0197061 A1 | 9/2005 | Hundal | |
| 2005/0216631 A1* | 9/2005 | Daly et al. | 710/110 |
| 2006/0007151 A1 | 1/2006 | Ram | |
| 2006/0025074 A1 | 2/2006 | Liang et al. | |
| 2006/0084469 A1 | 4/2006 | Malone et al. | |
| 2006/0280270 A1* | 12/2006 | Ibrahim et al. | 375/354 |
| 2006/0292985 A1 | 12/2006 | Chen | |
| 2007/0063037 A1 | 3/2007 | Silverbrook et al. | |
| 2007/0232233 A1* | 10/2007 | Liu et al. | 455/41.2 |

OTHER PUBLICATIONS

"CMOS Voltage Converters", Intersil, Oct. 5, 2005 located at http://www.intersil.com/data/fn/fn3072.pdf.*
International Search Report, International Application No. PCT/US08/02384, Applicant's Reference No. SIG000282-WO, Jun. 25, 2008, (8 pgs).

(Continued)

*Primary Examiner* — Temesgh Ghebretinsae
*Assistant Examiner* — Gennadiy Tsvey
(74) *Attorney, Agent, or Firm* — Toler Law Group

(57) ABSTRACT

A wireless transceiver includes a first integrated circuit and a second integrated circuit. The first integrated circuit includes a memory module that stores a plurality of operational instructions for implementing a plurality of protocol layers of a wireless protocol, a processing module that executes the plurality of operational instructions, and a first interface module. The second integrated circuit includes a second interface module that couples data to and from the first interface module, an RF transceiver that modulates a first baseband signal to produce a transmitted RF signal, and that demodulates a received RF signal to produce a second baseband signal, and a baseband module that generates the first baseband signal based on data received from the first interface module via the second interface module, and that generates data based on the second baseband signal to send to the first interface module via the second interface module.

32 Claims, 15 Drawing Sheets

OTHER PUBLICATIONS

Non-Final Office Action, U.S. Appl. No. 11/728,263, Oct. 26, 2009, (23 pgs).

Data Sheet—Oct. 5, 2005—FN3072.7, CMOS Voltage Converters, Intersil Corporation, www.intersil.com/data/fn/fn3072, (11 pgs).

International Search Report and Written Opinion received for PCT Application No. PCT/US08/02512 from the International Searching Authority (EPO) mailed Jul. 7, 2008, 13 pages.

LTC1099, "High Speed 8-Bit A/D Converter with Built-In Sample-and-Hold," Linear Technology Corporation, 1630 McCarthy Blvd., Milpitas, CA 95035-7417, <www.linear-tech.com>, 1989, 16 pages.

Final Office Action received for U.S. Appl. No. 11/728,263 from the United States Patent and Trademark Office (USPTO) mailed Mar. 19, 2010, 29 pages.

Notice of Allowance and Fee(s) Due received for U.S. Appl. No. 11/728,263 from the United States Patent and Trademark Office (USPTO) mailed Jan. 14, 2011, 7 pages.

* cited by examiner

WIRELESS TRANSCEIVER AND METHOD FOR USE THEREWITH

CROSS REFERENCE TO RELATED PATENTS

The present application is related to the following U.S. patent application that is contemporaneously filed and commonly assigned:

WIRELESS HANDSET AND WIRELESS HEADSET WITH WIRELESS TRANSCEIVER, having Ser. No. 11/728,263 and filed on Mar. 23, 2007, the content of which is hereby incorporated by reference in its entirety herein.

BACKGROUND OF THE INVENTION

1. Technical Field of the Invention

The present invention relates to wireless transceivers and applications thereof.

2. Description of the Related Art

As is known, wireless handsets are commonly used to access long range communication networks. Examples of such networks include wireless telephone networks that operate cellular, personal communications service (PCS), general packet radio service (GPRS), global system for mobile communications (GSM), and integrated digital enhanced network (iDEN). These networks are capable of accessing the plain old telephone service (POTS) network as well as broadband data networks that provide Internet access and enhanced services such as streaming audio and video, television service, etc., in accordance with international wireless communications standards such as 2G, 2.5G and 3G.

Integrated circuits have enabled the creation of a plethora of handheld devices, however, to be "wired" in today's electronic world, a person needs to posses multiple handheld devices. For example, one may own a cellular telephone for cellular telephone service, a personal digital assistant (PDA) for scheduling, address book, etc., one or more thumb drives for extended memory functionality, a motion picture expert group (MPEG) audio layer 3 (MP3) player for storage and/or playback of digitally recorded music, a radio, etc. Thus, even though a single handheld device may be relatively small, carrying multiple handheld devices on one's person can become quite burdensome.

Wireless handsets can contain a short range wireless transceiver, such as a Bluetooth transceiver that operates in accordance with a Bluetooth standard. Such a transceiver allows the wireless handset to communicate with other Bluetooth compatible devices, such as wireless headsets. These Bluetooth transceivers can be implemented using one or more integrated circuits. Examples include Bluetooth host controller interface (HCI) chips and chipsets, the Qualcomm BlueRF chip set, etc. Further improvements to these existing designs are possible and the disadvantages of these prior art designs will be apparent to one of ordinary skill when presented the teaching of the present invention.

DETAILED DESCRIPTION OF THE INVENTION

Figure 1:
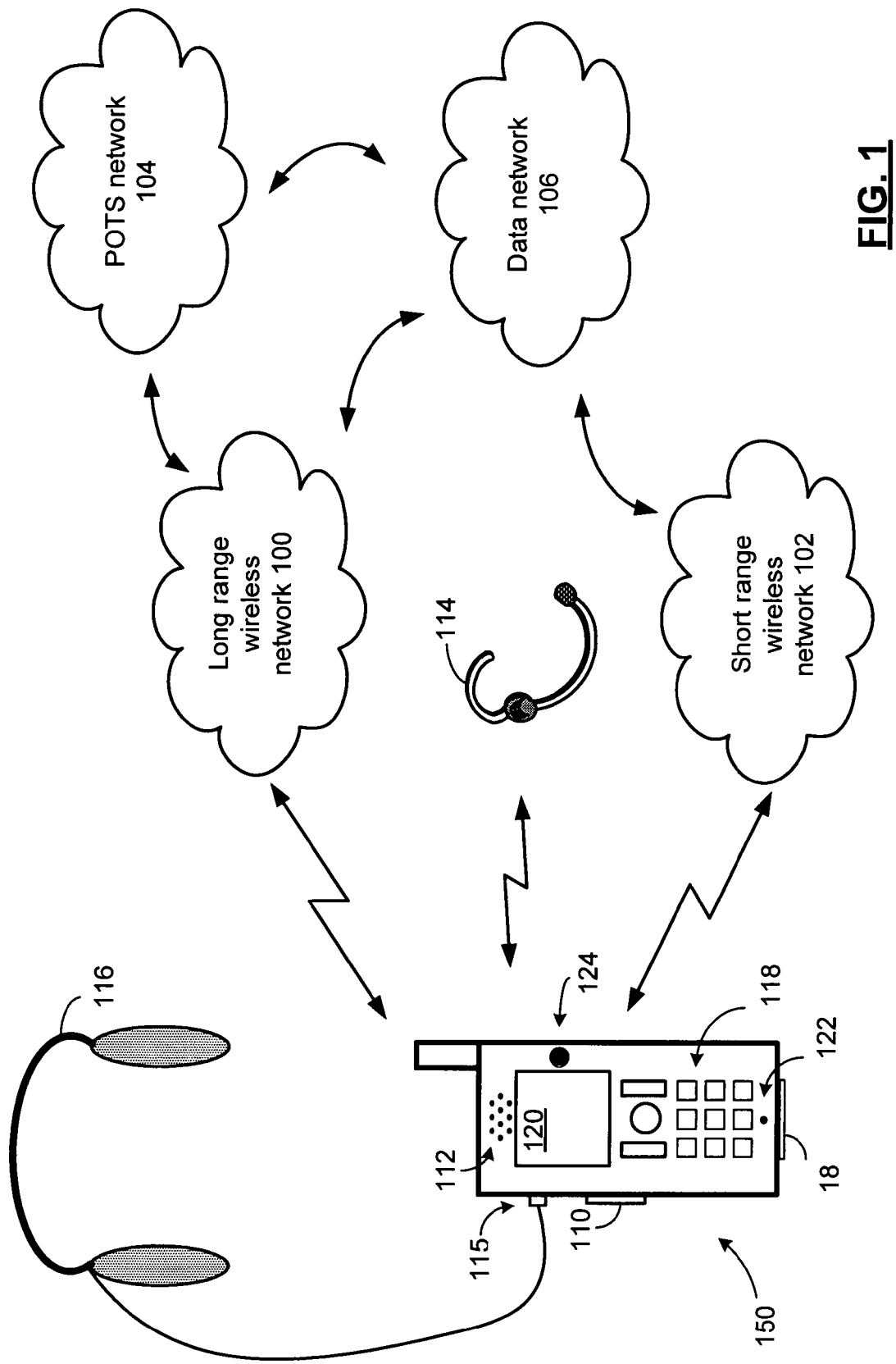
FIG. 1 presents a pictorial representation of a wireless handset 150 in accordance with an embodiment of the present invention.

FIG. 1 presents a pictorial representation of a wireless handset in accordance with an embodiment of the present invention. In particular, a wireless handset 150 communicates over a long range wireless network 100 that is operably coupled to the POTS network 104 and data network 106. Wireless handset 150 can further communicate over short range wireless network 102 to data network 106. In an embodiment of the present invention, long range network 100 includes a wireless telephone network such as a cellular, PCS, GPRS, GSM, iDEN or other wireless communications network capable of sending and receiving telephone calls. Further, data network 106 includes the Internet and short range wireless network 102 includes an access point that communicates with the wireless handset 150 via a radio frequency communications link such as 802.11x, Bluetooth, ultrawideband (UWB), Wimax, a wireless local area network connection or other communications link. In this fashion, wireless handset 150 can place and receive telephone calls such as normal wireless telephone calls sent over the wireless telephone network and or voice over Internet protocol (VoIP) calls sent entirely or partially over data network 106, text messages such as emails, short message service (SMS) messages, pages and other data messages that may include multimedia attachments such as documents, audio files, video files, images and other graphics. Within the broad scope of the present invention, a wireless handset can include a mobile telephone, portable audio player, portable media player, portable game console or other devices with either a short range or long range wireless transceiver as described herein.

Wireless handset 150 includes internal audio input device such as microphone 122 and internal audio output device such as speaker 112. In addition, headphones 116 can optionally be connected via headphone jack 115. Wireless headset 114 further includes an audio input device and audio output device that are connected to wireless handset 150 by a short range wireless communications link that uses an infrared link such as IrDA, or a radio frequency communications link conforming to the Bluetooth standard. The user interface of wireless handset 150 includes a keypad 118 and a display device 120 for displaying graphics and text, and optionally providing an additional touch sensitive interface with soft keys and/or graphics input and or handwriting recognition.

Wireless handset 150 optionally includes a camera 124 for capturing still and/or video images, removable memory card 110 for providing additional memory and removable storage, and host interface 18 for uploading and downloading information directly to a host device such as a computer.

The various features and functions of wireless handset 150 will be discussed in conjunction with the figures that follow.

Figure 2:
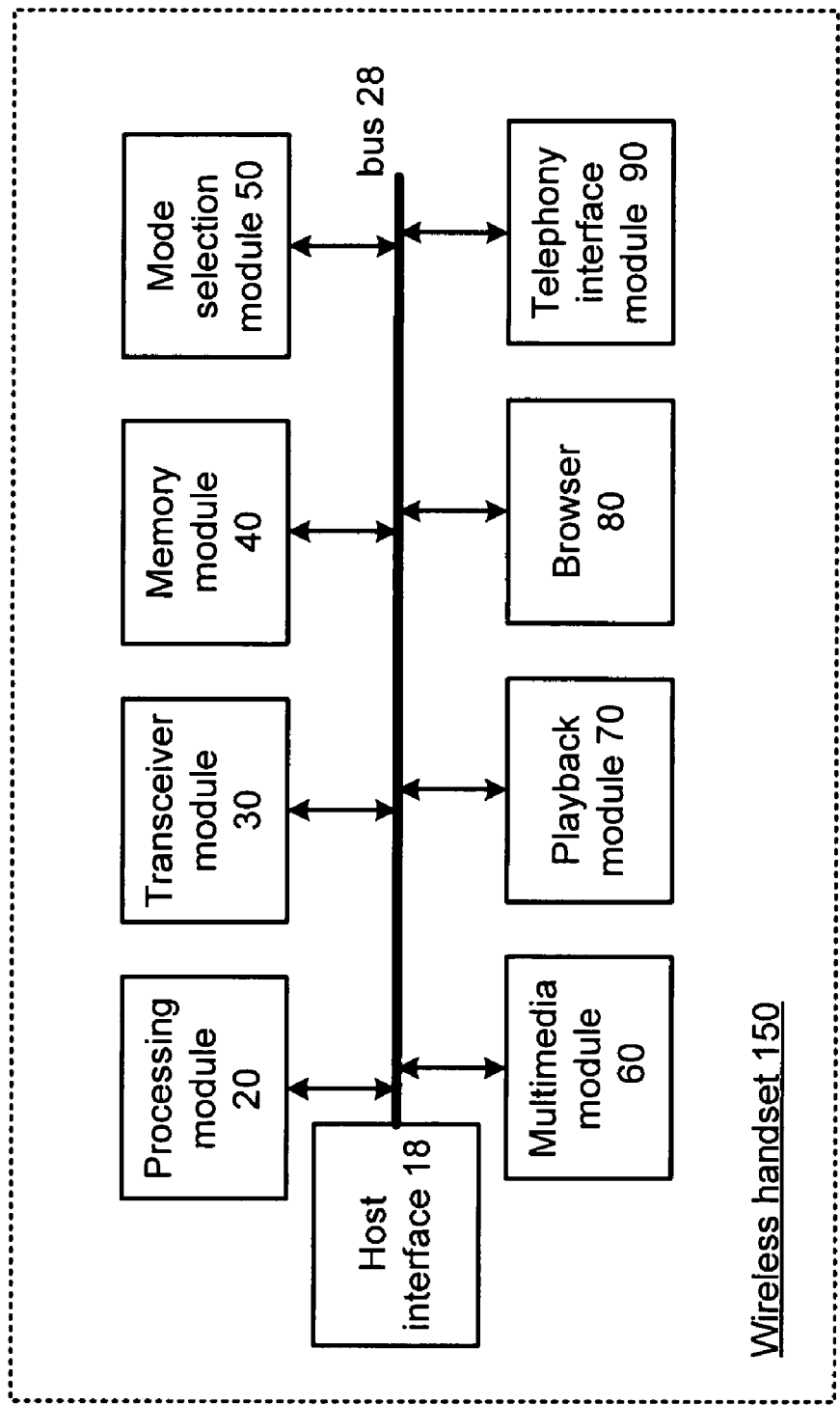
FIG. 2 presents a block diagram representation of wireless handset 150 in accordance with an embodiment of the present invention.

FIG. 2 presents a block diagram representation of wireless handset 150 in accordance with an embodiment of the present invention. In particular, wireless handset 150 includes a processing module 20 and memory module 40 that communicate via bus 28. In an embodiment of the present invention, processing module 20 includes a processor for executing a series of operational instructions such as system programs, application programs, and other routines.

The processor of processing module 20 can be implemented using a dedicated or shared microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. Note that when the processing module 20 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory module 40 stores, and the processing module 20 executes, operational instructions corresponding to at least some of the steps and/or functions illustrated herein.

The memory module 40 may be a single memory device or a plurality of memory devices. Such a memory device may be a read-only memory, random access memory, volatile memory, non-volatile memory, static memory, dynamic memory, flash memory, cache memory, and/or any device that stores digital information.

In addition, wireless handset 150 includes host interface 18, a telephony interface 90 for providing optional wireless telephone functionality and a user interface for retrieving, selecting and composing text messages, sending and receiving calls, etc., a transceiver module 30 that includes one or more transceivers, a mode selection module 50 for placing the wireless handset 150 in one or more operating modes, a multimedia module 60 for processing input and output, an playback module 70 for processing audio and/or video output, and a browser 80 for providing a user interface for Internet access and similar content for accessing streaming audio and streaming video content, and for downloading data files such as may be text files, presentation files, user profile information for access to varies computer services (e.g., Internet access, email, etc.), digital audio files (e.g., MP3 files, WMA—Windows Media Architecture—, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. In an embodiment of the present invention, browser 80 includes a plurality of operational instructions of software or firmware that are stored in memory module 40 and executed by processing module 20 to provide a graphical user interface for the user of wireless handset 150 to access data network 106. Browser 80 can include a Web browser that is configured to access websites, such as selected sites or other sites in a resolution that conforms to the resolution and size of the display device 120.

In an embodiment of the present invention, memory module 40 stores a digitally formatted file such as a compressed or uncompressed audio file (e.g., MP3, WMA, AAC), digital video files (such as MPEG4, MPEG4 part 10, or VC1 files) that include program content such as a song, audio book, audio clip, video clip, movie, photo, television show, or other audio, video or multimedia content. Playback module 70 plays the digitally formatted file by generating an analog or digital audio signal and/or analog or digital video signal, from the program content for an internal speaker, external speaker or headphones, display 120.

Each of these modules may be implemented in hardware, firmware, software or a combination thereof, however, in an embodiment of the present invention, the transceiver module 30 includes a short range wireless transceiver 250 that will be discussed in greater detail in conjunction with FIG. 9. While a particular bus architecture is shown in FIG. 2, alternative bus architectures that include further connectivity, such as direct connectivity between the various modules, are likewise possible to implement the features and functions included in the various embodiments of the present invention.

Figure 3:
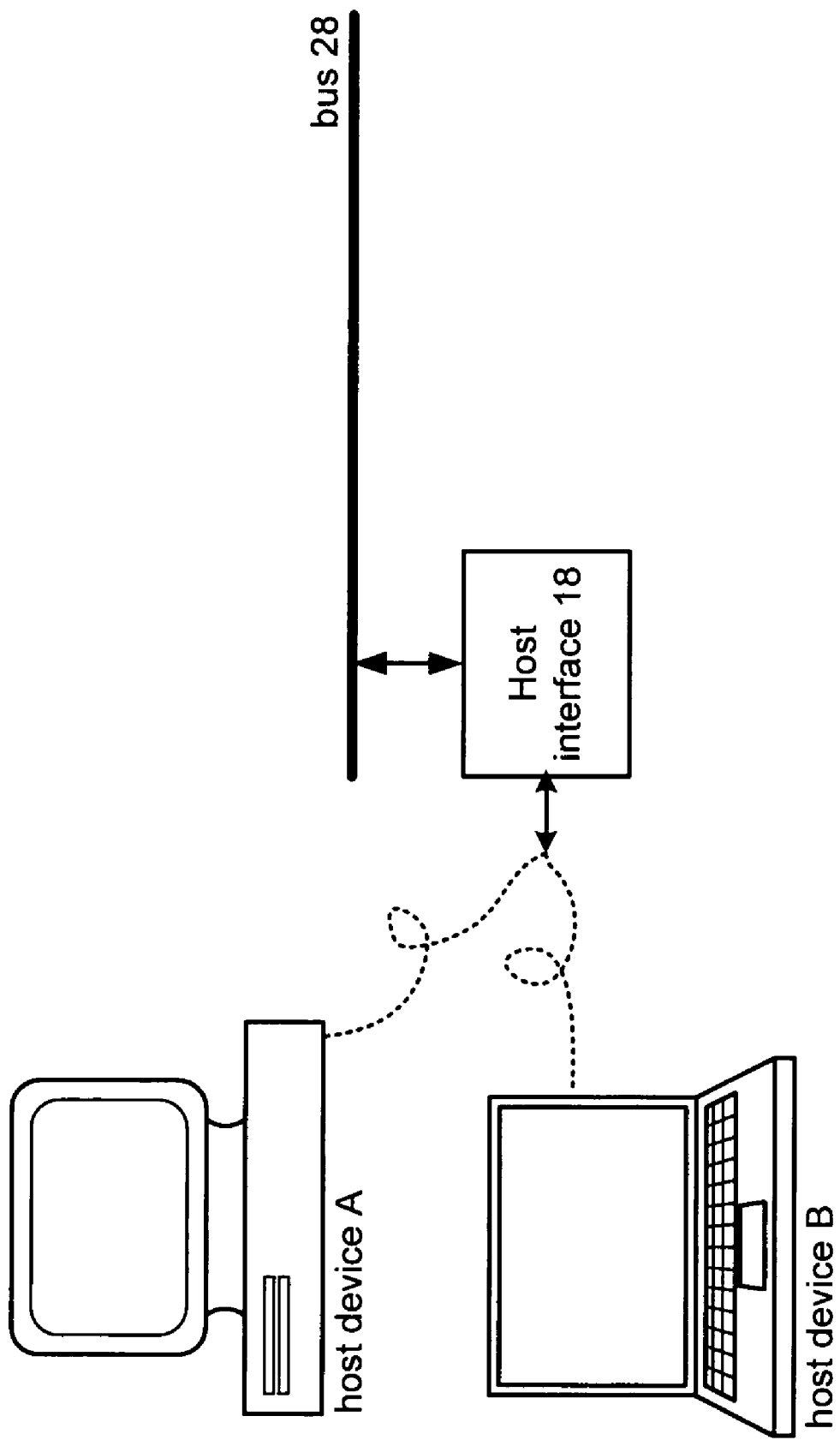
FIG. 3 presents a block/pictorial diagram of a host interface 18 in accordance with an embodiment of the present invention.

FIG. 3 presents a block/pictorial diagram of a host interface 18 in accordance with an embodiment of the present invention. In particular, the operation of a wireless handset is described when the optional host interface 18 is included. When the wireless handset 150 is operably coupled to a host device A or B, which may be a personal computer, workstation, server (which are represented by host device A), a laptop computer (host device B), a personal digital assistant and/or any other device that may transceive data with the multi-function handheld device, the mode selection module 50 places the wireless handset 150 in a host connected mode.

When the wireless handset 150 is in the host connected mode, the host interface 18 facilitates the transfer of data between the host device A or B and the wireless handset 150. For example, data received from the host device A or B is first received via the host interface 18. Depending on the type of coupling between the host device and the wireless handset 150, the received data will be formatted in a particular manner. For example, if the wireless handset is coupled to the host device via a USB cable, the received data will be in accordance with the format by the USB specification. The host interface 18 converts the format of the received data (e.g., USB format) into a desired format by removing overhead data that corresponds to the format of the received data and storing the remaining data as data words. The size of the data words generally corresponds directly to, or a multiple of, the bus width of the bus 28 and the word line size (i.e., the size of data stored in a line of memory) of memory module 40. Under the control of the processing module 20, the data words are provided to memory module 40 for storage. In this mode, the wireless handset 150 is functioning as extended memory of the host device (e.g., like a thumb drive).

In furtherance of the host connected mode, the host device may retrieve data from memory module 40 as if the memory were part of the computer. Accordingly, the host device provides a read command to the wireless handset 150, which is received via the host interface 18. The host interface 18 converts the read request into a generic format and provides the request to the processing module 20. The processing module 20 interprets the read request and coordinates the retrieval of the requested data from memory module 40. The retrieved data is provided to the host interface 18, which converts the format of the retrieved data from the generic format of the wireless handset 150 into the format of the coupling between the wireless handset and the host device. The host interface 18 then provides the formatted data to the host device via the coupling.

The coupling between the host device and the wireless handset 150 may be a wireless connection or a wired connection. For instance, a wireless connection, provided by transceiver module 30 may be in accordance with Bluetooth, IEEE 802.11x, and/or any other wireless LAN (local area network) protocol, IrDA, etc. The wired connection may be in accordance with one or more Ethernet protocols, Firewire, USB, etc. Depending on the particular type of connection, the host interface 18 includes a corresponding encoder and decoder. For example, when the wireless handset 150 is coupled to the host device via a USB cable, the host interface 18 includes a USB encoder and a USB decoder.

As one of average skill in the art will appreciate, the data stored in memory module, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format.

In an embodiment of the present invention, when the wireless handset 150 is coupled to the host device A or B via a wired connection or direct coupling, the host device may power the wireless device 150 such that the battery is unused and/or may further recharge the battery of wireless device 150. When the wireless handset 150 is uncoupled from the host device, the mode selection module 50 detects the disconnection and places the wireless handset in an alternative operational mode.

Figure 4:
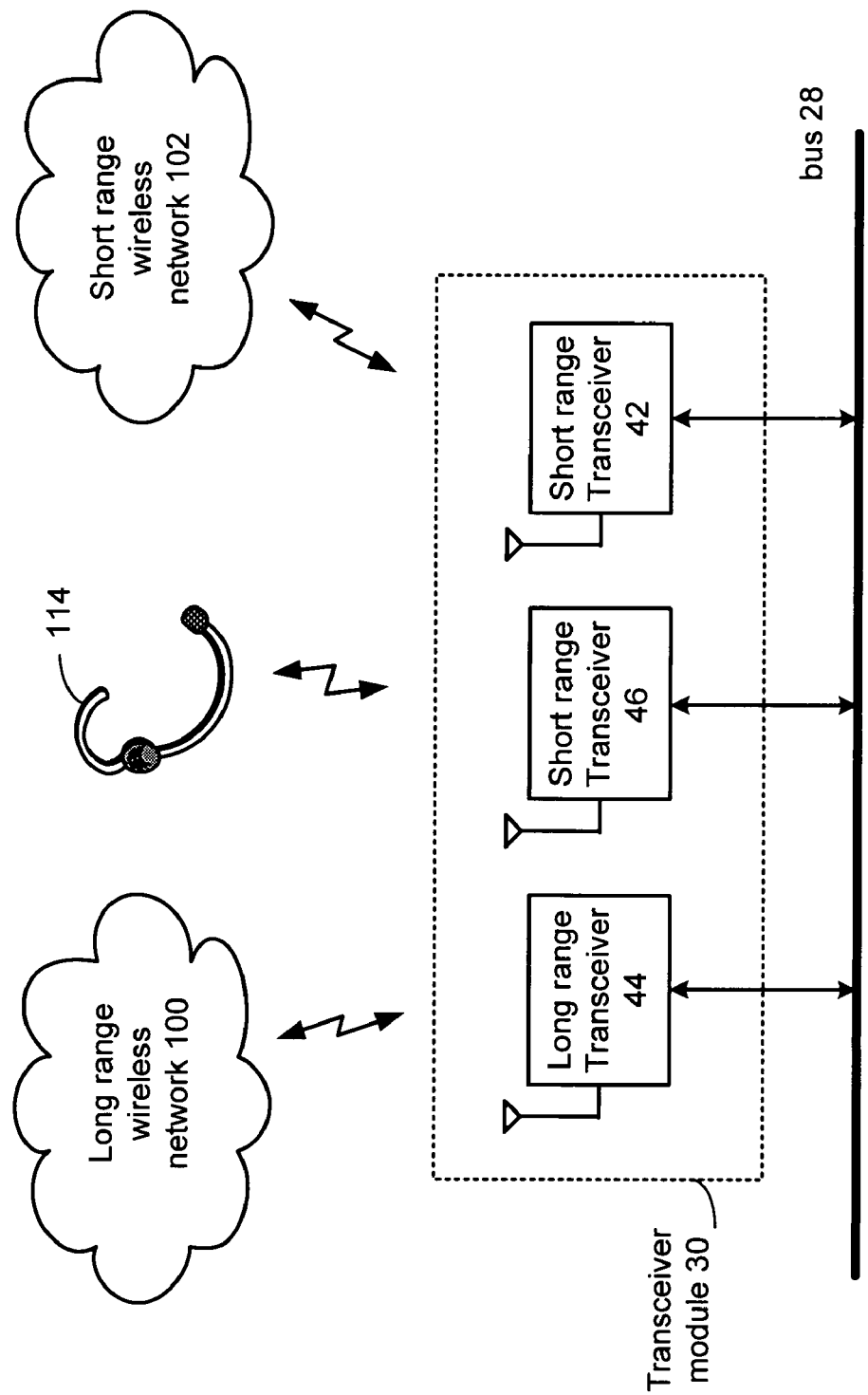
FIG. 4 presents block/pictorial representation of transceiver module 30 in accordance with an embodiment of the present invention.

FIG. 4 presents block/pictorial representation of transceiver module 30 in accordance with an embodiment of the present invention. In an embodiment of the present invention, transceiver module 30 includes long range transceiver 44, and short range transceivers 42 and 46. Long range transceiver 44 provides access to long range wireless network 100, short range transceiver 42 provides access to short range wireless network 102 and short range transceiver 46 provides access to wireless peripheral devices such as host A or B when host interface 18 is implemented with a wireless connection, wireless headset 114, a wireless keyboard or other devices.

Figure 5:
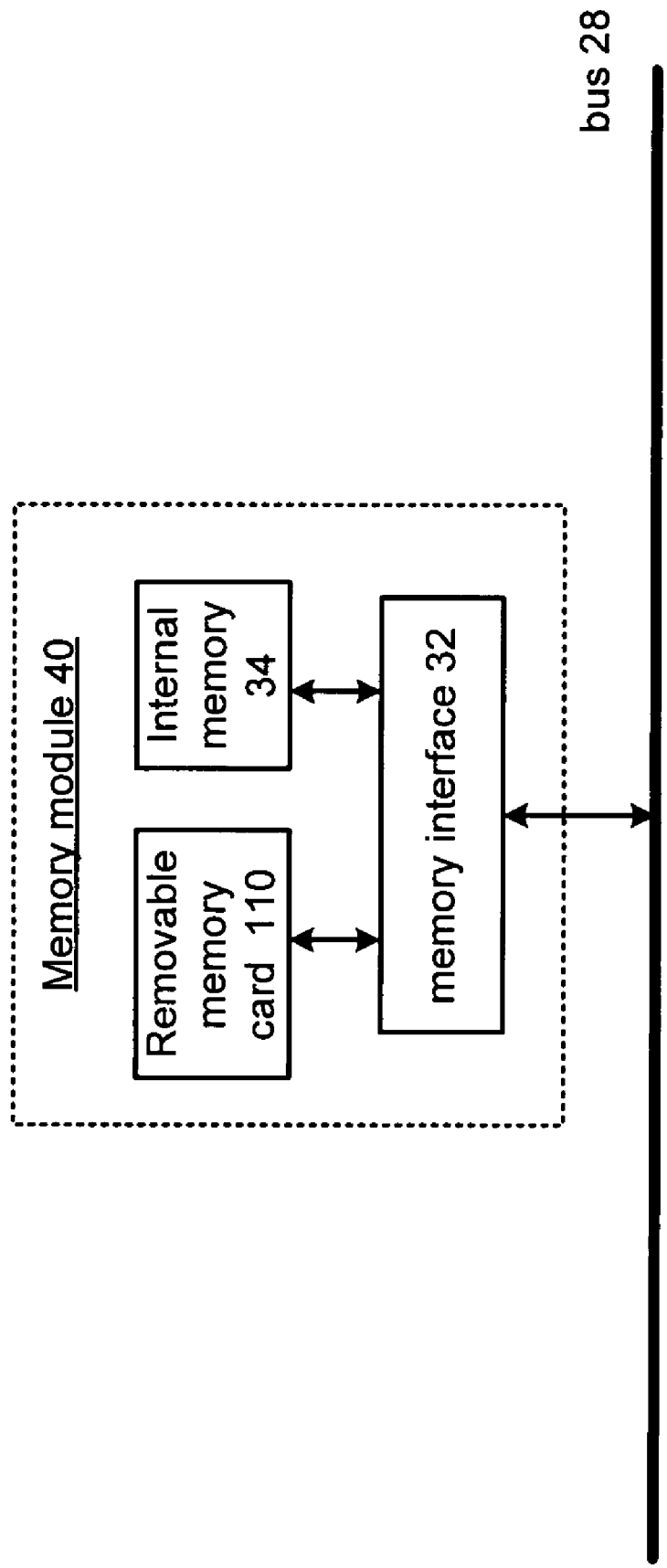
FIG. 5 presents a block diagram representation of memory module 40 in accordance with an embodiment of the present invention.

FIG. 5 presents a block diagram representation of memory module 40 in accordance with an embodiment of the present invention. In particular, memory module 40 includes a memory interface 32 for accessing an internal memory 34 and removable memory card 110. In an embodiment of the present invention, removable memory card 110 can include non-volatile memory in a format such as CompactFlash, SmartMedia, Memory Stick, Secure Digital (SD) card, xD card or other memory card format. In an embodiment of the present invention, removable memory card 110 can store data such as text files, presentation files, user profile information for access to varies computer services (e.g., Internet access, email, etc.), digital audio files (e.g., MP3 files, WMA—Windows Media Architecture—, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format.

Figure 6:
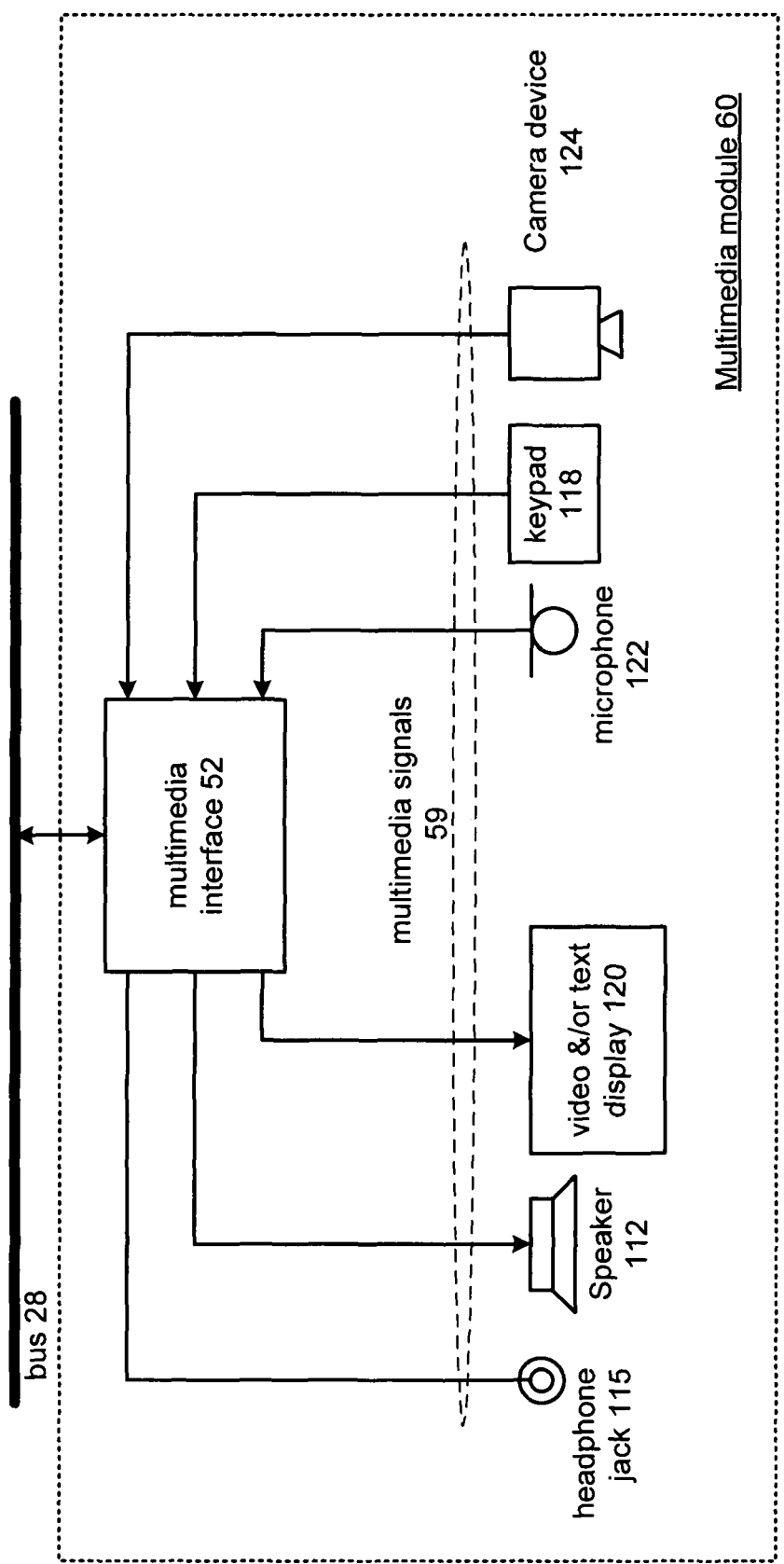
FIG. 6 presents a block/schematic diagram representation of a multimedia module 60 in accordance with an embodiment of the present invention.

FIG. 6 presents a block/schematic diagram representation of a multimedia module in accordance with an embodiment of the present invention. In particular, multimedia module 60 includes a multimedia interface 52 for providing multimedia signals to and from a variety of input/output devices including headphones 116 via headphone jack 115, speaker 112, video and/or text display 120, microphone 122, keypad 118 and camera device 124. These multimedia signals 59 may be analog signals, discrete time signals, or digital signals depending on particular form and format used by each device.

Figure 7:
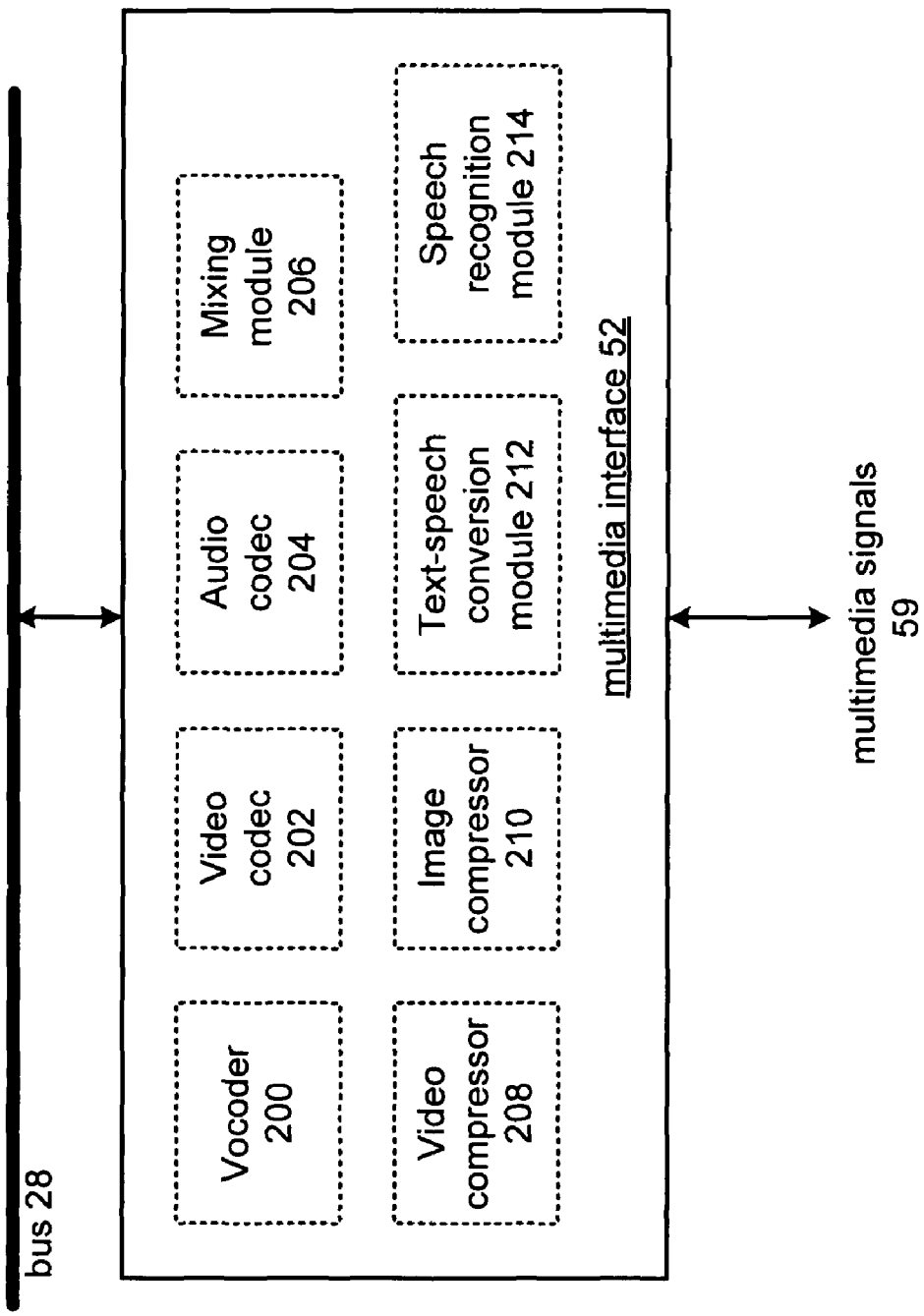
FIG. 7 presents a block diagram representation of a multimedia interface 52 in accordance with an embodiment of the present invention.

FIG. 7 presents a block diagram representation of a multimedia interface 52 in accordance with an embodiment of the present invention. In particular, multimedia interface 52 provides digital to analog conversion, analog to digital conversion, formats output signals sent to output devices of multimedia module 60 and processes input signals for coding, compression, storage and further processing by the various submodules of multimedia interface 52 and by the other modules of wireless handset 150. The submodules of multimedia interface 52 optionally include one or more of the following: a vocoder 200 for digitizing voice signals, a video codec 202 for digitizing video signals, an audio codec 204 for creating compressed audio files, a mixing module 206 for mixing two or more audio streams, a video compressor 208 for creating compressed video files, an image compressor 210 for creating compressed image files, a text-to speech conversion module 212 for converting text data into to synthesized voice signals, and a speech recognition module 214 for recognizing the content of speech such as one or more spoken commands.

In an embodiment of the present invention under the control of the processing module 20, the multimedia module 60 retrieves multimedia data from memory module 40. The multimedia data includes at least one of digitized audio data, digital video data, and text data. In a playback mode, upon retrieval of the multimedia data, the multimedia module 60 converts the data into output data. For example, the multimedia module 60 may convert digitized data into analog signals that are subsequently rendered audible via a speaker or via a headphone jack. In addition, or in the alternative, the multimedia module 60 may render digital video data and/or digital text data into RGB (red-green-blue), YUV, etc., data for display on an LCD (liquid crystal display) monitor, projection CRT, and/or on a plasma type display, such as display 120.

In a storage mode, the wireless handset 150 may store digital information received via one of the input devices 118, 122 and 124. For example, a voice recording received via the microphone 122 may be digitized via the multimedia module 60 and digitally stored in memory module 40. Similarly, video recordings may be captured via the camera device 124 (e.g., a digital camera, a camcorder, VCR output, DVD output, etc.) and processed by the multimedia module 60 for storage as digital video data in memory module 40. Further, the keypad 118 (which may be a keyboard, touch screen interface, or other mechanism for inputting text information) provides text data to the multimedia module 60 for storage as digital text data in memory module 40

As will be understood by one skilled in the art when presented the disclosure herein, the multimedia module 60 may include less than the components shown in FIGS. 6 and 7. For instance, the multimedia module 60 may process audio, but not video data, or vice versa. Further, the multimedia module 60 can include further coding, decoding, formatting, encryption, decryption and signal processing modules than are specifically shown. In addition, multimedia module 60 can be implemented with audio and video inputs, in addition to the inputs that are expressly illustrated.

Figure 8:
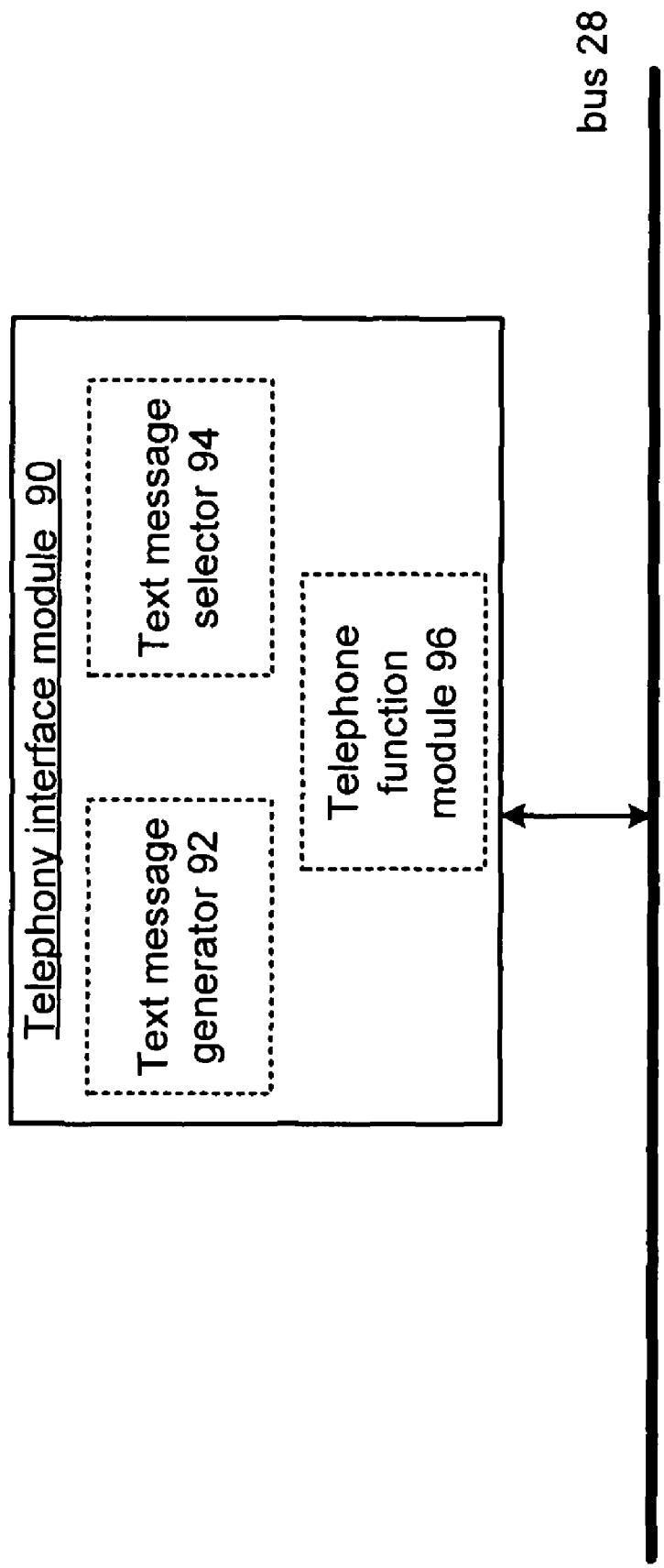
FIG. 8 presents a block diagram representation of a telephony interface 90 in accordance with an embodiment of the present invention.

FIG. 8 presents a block diagram representation of a telephony interface module 90 in accordance with an embodiment of the present invention. In particular, telephony interface module 90 includes a text message generator 92 that allows a user to compose a text message, and a text message selector 94 that allows a user to select one or more text messages that have been received. In an embodiment of the present invention, text message interface 90 includes an inbox folder, sent message folder, draft message folder, trash folder, and addresses folder that allow a user to receive, review, forward and reply to a text message that is received and to draft, edit, address, and attach files to a text message that is sent. In addition, telephone function module 96 provides other telephone functionality to wireless handset 150 including the ability to place and receive wireless calls and/or VoIP calls, to indicate the receipt of voicemail or text messages, to store telephone numbers, speed dial lists, to display call waiting and caller ID indicators, to store information on received calls, placed calls and missed calls, to select ringtones, to transfer calls, to place calls on hold, to initiate 3-way or conference calls, and to provide other telephony functions.

Figure 9:
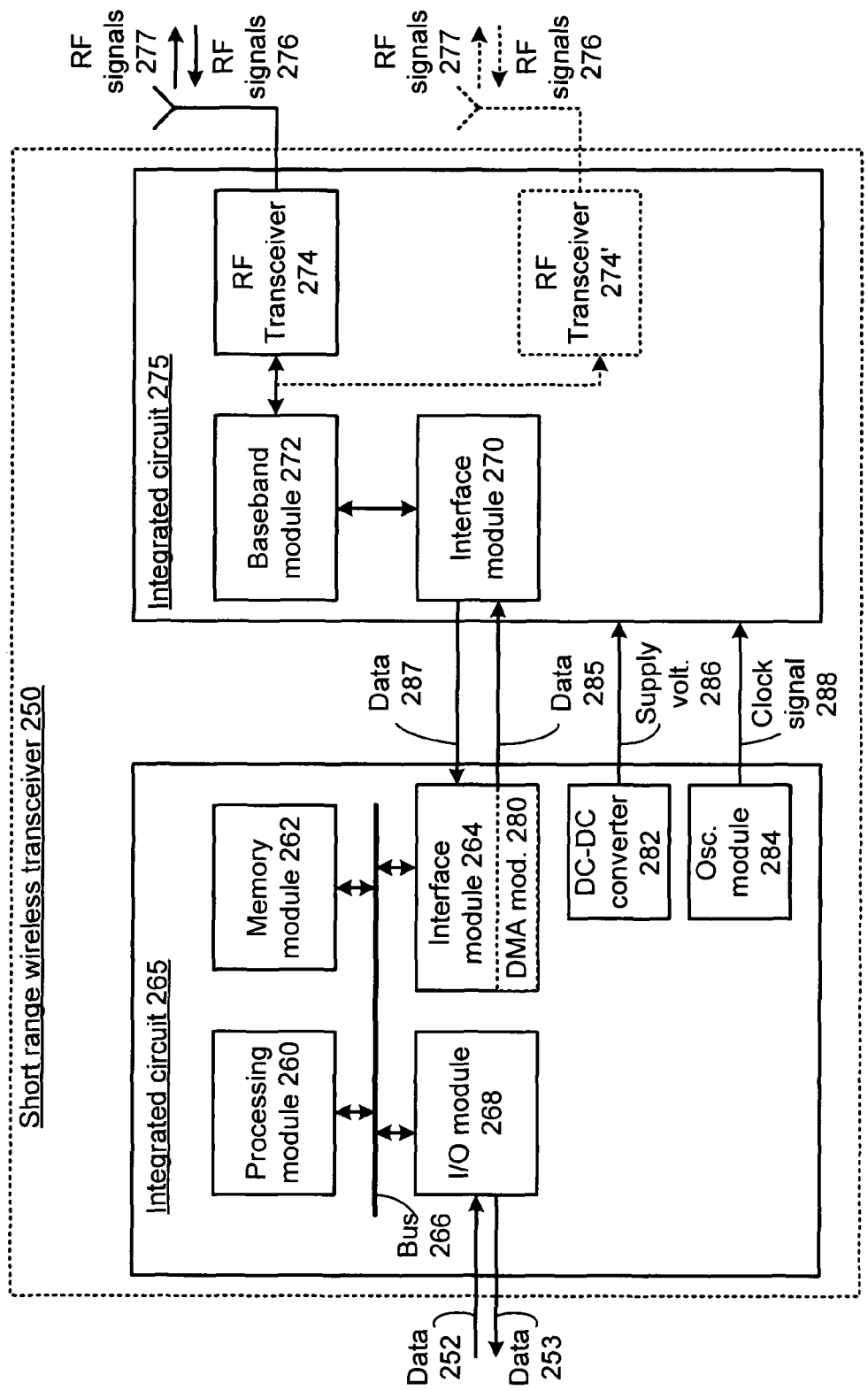
FIG. 9 presents a block/schematic diagram representation of a short range wireless transceiver 250 in accordance with an embodiment of the present invention.

FIG. 9 presents a block/schematic diagram representation of a short range wireless transceiver 250 in accordance with an embodiment of the present invention. In particular, short range wireless transceiver 250, such as short range transceiver 42 or 46, can receive data 252 from a device, such as wireless handset 150 that is converted into an RF signal 277 for communication with an external device in wireless communication therewith. In addition, RF signals 276 received from the external device are converted to data 253 that are transmitted to the wireless handset 150 or other device. Integrated circuit 265 and integrated circuit 275 operate cooperatively and are interfaced to bi-directionally communicate data between the two integrated circuits. In an embodiment of the present invention, the short range wireless transceiver 250 operating in accordance with a Bluetooth specification, such as one or more of the specifications set forth by the Bluetooth special interest group. However, in alternative embodiments, other short range or long range wireless protocols such as an 802.11 protocol, UWB or Wimax protocol can also be used.

Integrated circuit 265 includes an I/O module for coupling data 252 and 253 to and from the short range wireless transceiver 250 and the device, such as wireless handset 150, or other device that hosts short range wireless transceiver 250 or otherwise uses this wireless transceiver for communicating, via RF signals 276 and 277 with an external device. Processing module 260 and memory module 262 are coupled via bus 266 to I/O module 268 and interface module 264. While a particular bus architecture is shown in FIG. 2, alternative bus architectures that include further connectivity, such as direct connectivity between the various modules, are likewise possible to implement the features and functions included in the various embodiments described herein.

In operation, memory module 262 stores a plurality of operational instructions for implementing a plurality of protocol layers of a short range wireless protocol. Processing module 260 executes the plurality of operational instructions. Interface module 264 provides an interface to the integrated circuit 275. In one embodiment, the processing module 260 is implemented with general purpose processing circuitry such as a microprocessor, microcontroller, digital signal processor or other digital processor that executes software or firmware instructions that are stored in memory module 262.

Integrated circuit 275 includes an RF transceiver 274 that modulates a first baseband signal from baseband module 272 to produce a transmitted RF signal 277, and that demodulates a received RF signal 276 to produce a second baseband signal that is coupled to baseband module 272. Baseband module 272 generates the first baseband signal based on data 285 received from interface module 264 via the interface module 270, and based on the second baseband signal, generates data 287 to send to the interface module 264 via the interface module 270. Integrated circuit 275 optionally includes a second RF transceiver 274' for implementing a second wireless communication link and optionally includes additional transceivers for implementing other wireless communications links. In this fashion, short range wireless transceiver 250 can implement two separate communication links chosen from frequency modulation (FM), Bluetooth, Wimax, UWB and 802.11, etc. in a single chipset.

As discussed above, the short range wireless protocol includes a Bluetooth protocol and the plurality of protocol layers such as HCI driver, logical link control and adaption protocol (L2CAP) Link Manager (LM), Generalized multitransport object exchange protocol (OBEX), operating system (OS), serial port emulation (RFCOMM), real-time operating system (RTOS), synchronous connection oriented (SCO), service discovery protocol (SDP), telephony control protocol specification (TCS), or other protocols that can be separated into upper stack layers of the Bluetooth protocol and lower stack layers of the Bluetooth protocol. While some Bluetooth chipsets, such as HCI chips, use two integrated circuits that implement the upper stack protocols using a processor on one integrated circuit and implement the lower stack protocols on a processor of the second integrated circuit, the present invention implements both the upper stack and lower stack protocols using processing module 260 of integrated circuit 265. In addition, the baseband module 272 and RF transceiver 274 are implemented on a single chip using special purpose circuitry such as a hardware state machine, programmable logic array, logic gates and/or analog circuitry that perform real-time intensive tasks separate from the processing module 260. Because all of the Bluetooth software runs on the processing module 260, there is either no need for a dedicated processor and/or memory module on integrated circuit 275 or only limited processing and memory requirements such as a state machine or other special purpose processor and small memory on the order of 10 KB or less.

In an embodiment of the present invention, the interface modules 264 and 270 communicate include 4 or 5 (or optionally greater or fewer) data lines that implement a bi-directional parallel or serial communication path between integrated circuits 265 and 275 for sending and receiving data 285 and 287. Further, one or both of the interface modules 264 and 270 can include a universal asynchronous receiver transmitter (UART) a synchronous interface such as an 4-bit secure digital input output interface (SDIO) or a special purpose interface, etc. In addition, interface modules 264 and 270 can operate in a master/slave mode with one of the two interface modules, such as interface module 264 operating as the master and the other interface module, such as interface module 270 operating as a slave. Also, interface module 264 can include a direct memory access (DMA) module 280 that implements transfers of data 285 and 287 between the integrated circuits using a DMA structure. This use of automated DMA transfers offloads further processing requirements from processing module 260.

Integrated circuit 265 further includes a DC to DC converter 282 that generates one or more supply voltages, including supply voltage 286, from an external battery or other external DC power source (not shown). In addition, integrated circuit 265 includes an oscillator module 284 uses an external crystal (not shown) to generate one or more clock signals including clock signal 288, however in an alternative embodiment, the integrated circuit 275 includes oscillator module 284 that supplies clock signal 288 back to integrated circuit 265. At least one of the supply voltages generated by DC to DC converter 282 are used to power one or more of the modules of integrated circuit 265. In addition, at least one of the clock signals generated by oscillator module 284 are used supply timing to one or more of the modules of integrated circuits 265 and 275. Further the interface between integrated circuit 265 and 275 includes supply voltage 286 and clock signal 288 that are used to supply power and timing to one or more of the modules of integrated circuit 275. In particular, baseband module 272 and RF transceiver module 274 can operate based on the supply voltage 286 and clock signal 288. In a further embodiment integrated circuit 275 generates one or more additional supply voltages from the supply voltage 286, using a DC-to-DC converter, voltage regulator, or other voltage supply generator.

Figure 10:
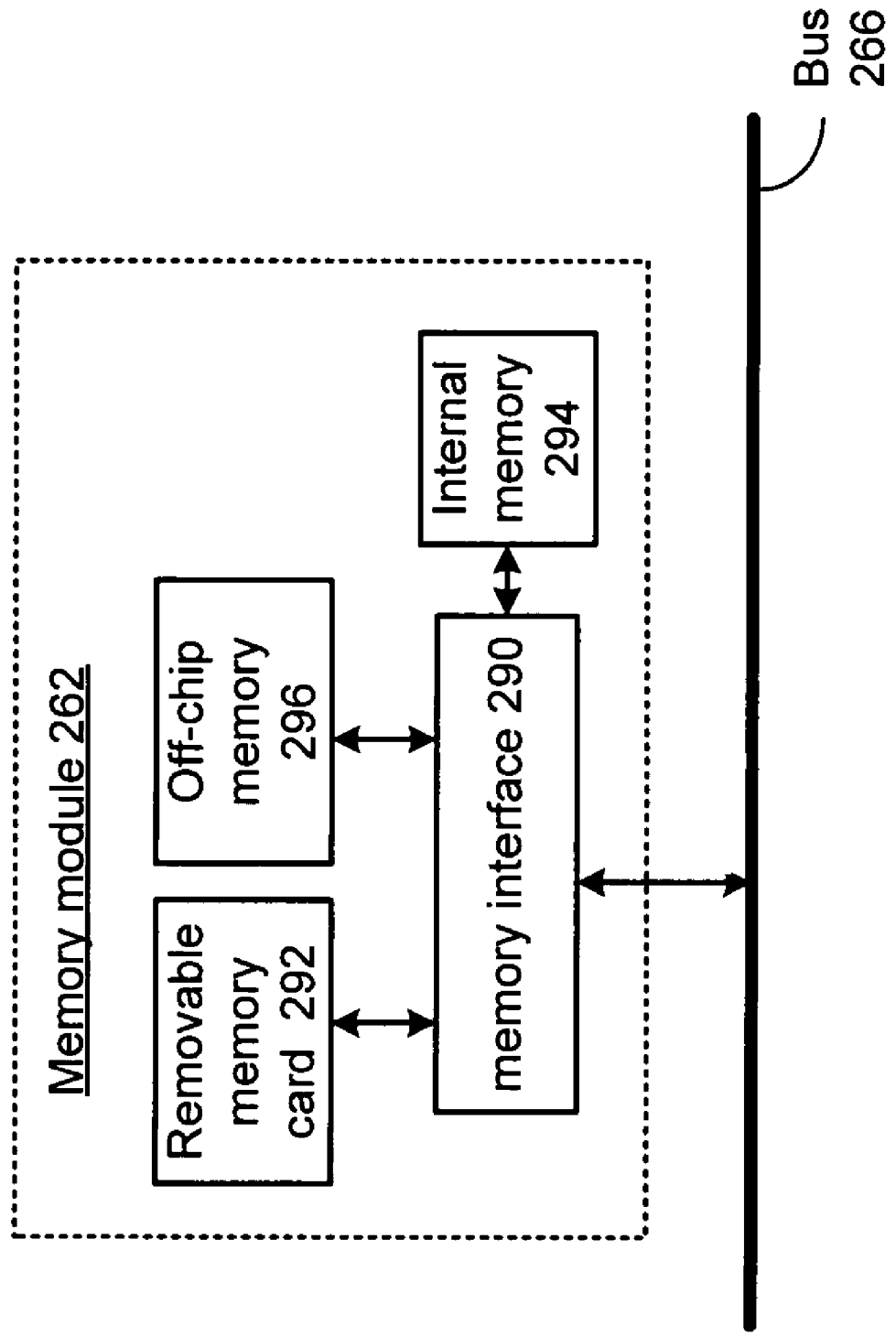
FIG. 10 presents a block diagram representation of memory module 262 in accordance with an embodiment of the present invention.

FIG. 10 presents a block diagram representation of memory module 262 in accordance with an embodiment of the present invention. In particular memory module 262 includes a memory interface 290, such as a general purpose memory interface that interfaces to a plurality of memory devices such as an internal memory 294 that is located on integrated circuit 265, an off chip memory 296 that is coupled to, but located external to, integrated circuit 265. In addition, memory interface optionally includes a further coupling to a removable memory card 292, such as an off-chip flash memory card, formatted as a memory stick, compact flash card, etc. In an embodiment of the present invention, internal memory and off-chip memory can be static random access memory, dynamic random access memory, read only memory, flash memory or other type of memory or storage.

Figure 11:
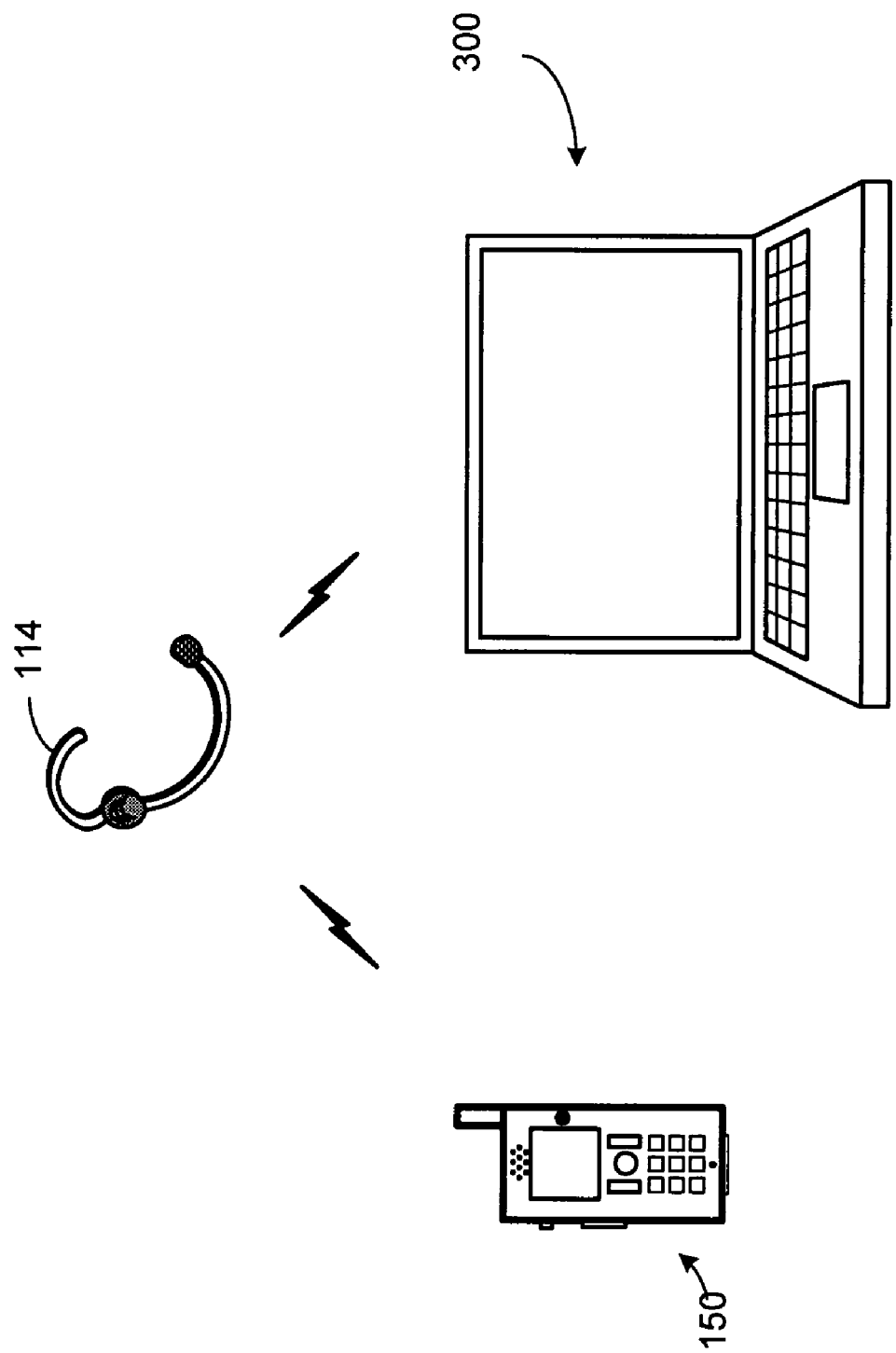
FIG. 11 presents a pictorial representation of a wireless headset 114 in accordance with an embodiment of the present invention.

FIG. 11 presents a pictorial representation of a wireless headset 114 in accordance with an embodiment of the present invention. In particular, while the foregoing description has discussed short range wireless transceiver 250 in conjunction with its use in wireless handset 150, this short range wireless transceiver can also be incorporated in other devices, such as headset 114 for receiving audio from other devices such as wireless handset 150 and personal computer 300 and sending voice signals back to these devices that are generated by an integrated microphone.

Figure 12:
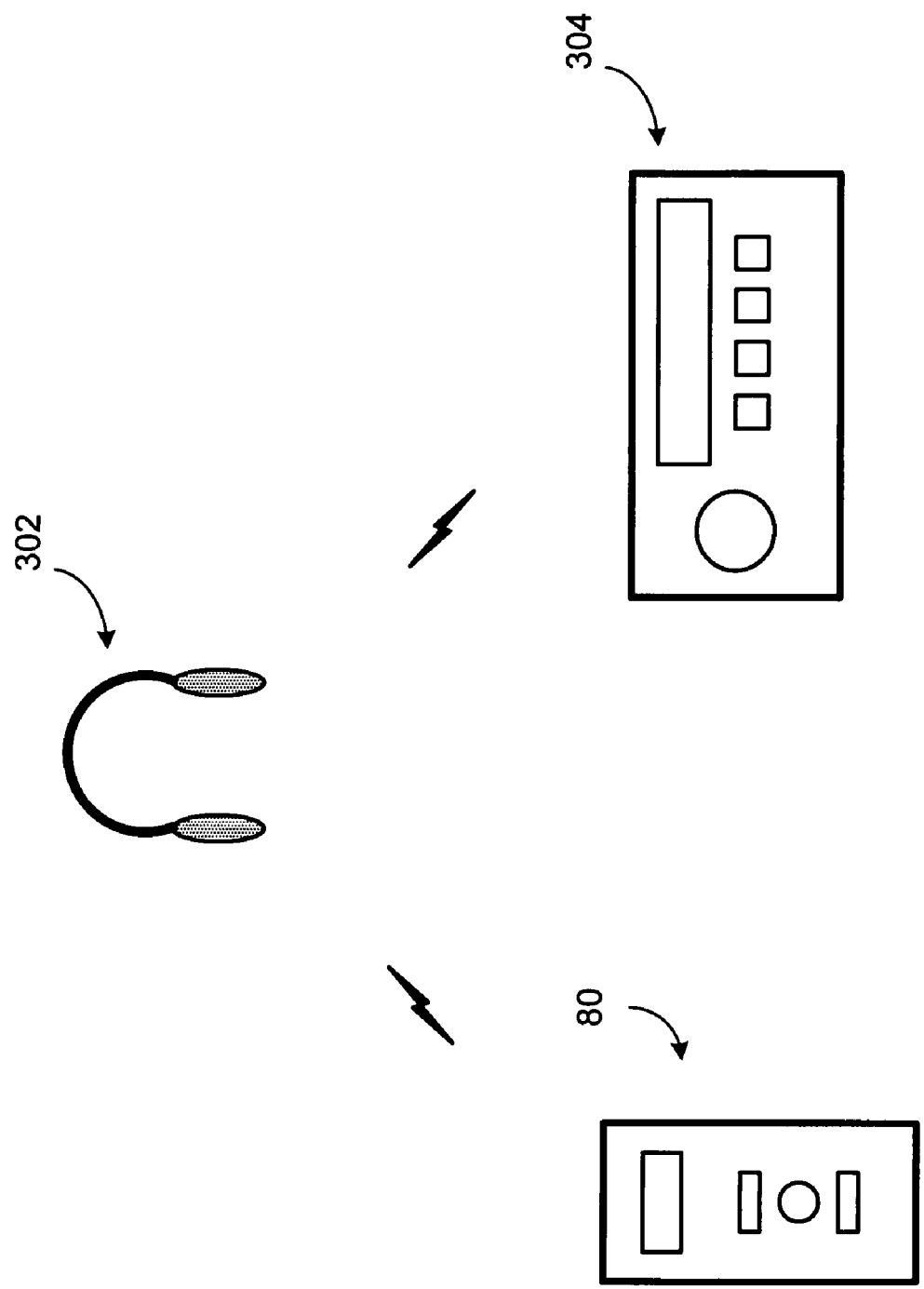
FIG. 12 presents a pictorial representation of a wireless headset 302 in accordance with an embodiment of the present invention.

FIG. 12 presents a pictorial representation of a wireless headset 302 in accordance with an embodiment of the present invention. In particular, an alternative wireless headset configuration is presented that receives audio from a device such as a portable audio/video player 80 or a home/car stereo system, 304, without headset 302 having a microphone and a voice back channel to these devices.

Figure 13:
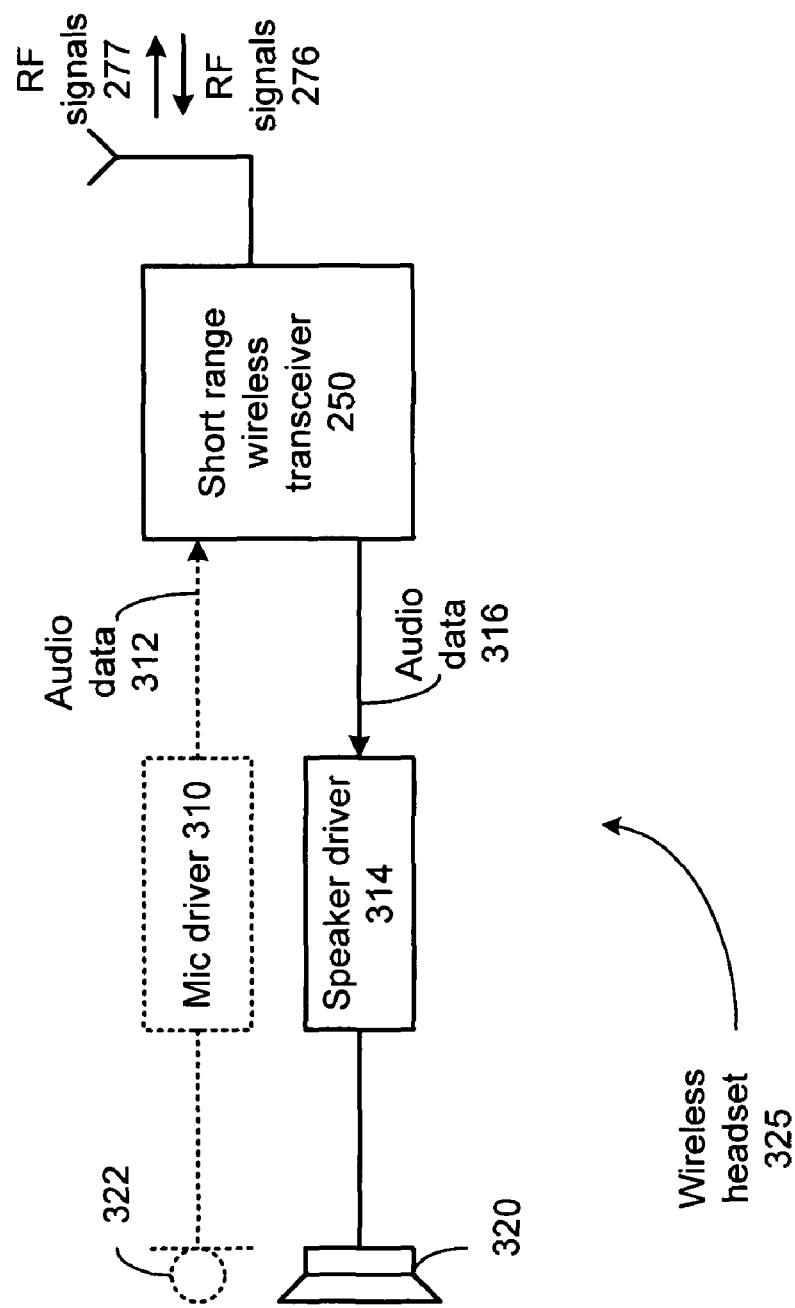
FIG. 13 presents a pictorial block diagram representation of a wireless headset 325 in accordance with an embodiment of the present invention.

Further details regarding the implementation of wireless headsets 114 and 302 are presenting in conjunction with FIG. 13 that follows.

FIG. 13 presents a pictorial block diagram representation of a wireless headset 325 in accordance with an embodiment of the present invention. In particular, a possible implementation for wireless headset such as wireless headset 114 or 302 is presented.

The wireless headset optionally includes a microphone 322 and a microphone driver 310 that generates first audio data in response to speech from a user. In an embodiment of the present invention, microphone driver 310 optionally supplies power to microphone 322, when microphone 322 requires a source of power. Voice signals from a user of wireless headset 325 are converted to an analog voice signal that is sampled and digitized by microphone driver into audio data 312 in a digital audio format such as a pulse code modulation (PCM) format, a compressed audio format or other digital format.

The wireless headset 325 includes a speaker 320 and speaker driver 314 that drives the speaker in response to audio data 316. In operation, audio data 316, in a digital audio format such as a pulse code modulation (PCM) format, a compressed audio format or other digital format, is converted to an analog signal by speaker driver 314. In addition, speaker driver 314 includes a power amplifier that generates an analog output signal with sufficient power to driver the speaker 320. While a single speaker 320 is shown, audio data 316 optionally includes a plurality of audio channels such as a right and left stereo audio channel, speaker driver generates two or more analog output signals to drive two or more speakers 320.

Short range wireless transceiver 250 is coupled to the speaker driver 314 and the optional microphone driver 310 and is coupleable to a remote compatible device. Short range wireless transceiver sends the audio data 312 to the remote compatible device and receives the audio data 316 from the remote compatible device via RF signals 276 and 277.

Figure 14:
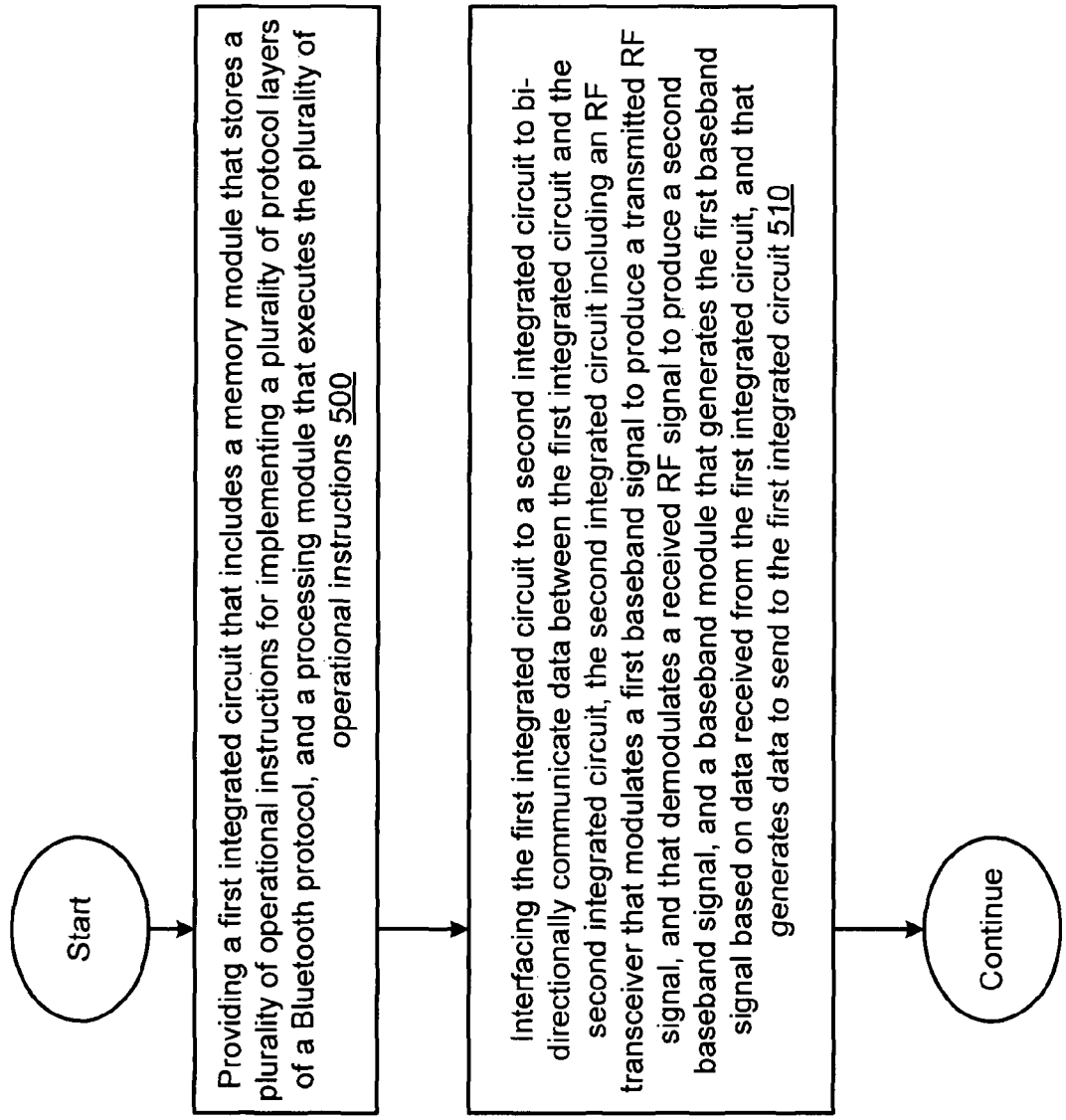
FIG. 14 presents a flowchart representation of a method in accordance with an embodiment of the present invention.

FIG. 14 presents a flowchart representation of a method in accordance with an embodiment of the present invention. In particular, a method is presented for use in conjunction with one or more functions and features described in association with FIGS. 1-13. In step 500, a first integrated circuit is provided that includes a memory module that stores a plurality of operational instructions for implementing a plurality of protocol layers of a Bluetooth protocol, and a processing module that executes the plurality of operational instructions. In step 510, the first integrated circuit is interfaced to a second integrated circuit to bi-directionally communicate data between the first integrated circuit and the second integrated circuit, the second integrated circuit including an RF transceiver that modulates a first baseband signal to produce a transmitted RF signal, and that demodulates a received RF signal to produce a second baseband signal, and a baseband module that generates the first baseband signal based on data received from the first integrated circuit, and that generates data to send to the first integrated circuit.

In an embodiment of the present invention, the plurality of protocol layers include a plurality of upper stack layers of the Bluetooth protocol and a plurality of lower stack layers of the Bluetooth protocol. In addition, step 510 can include controlling the communication of the data between the first integrated circuit and the second integrated circuit via direct memory access. Also, step 510 can include communicating the data via a serial communication path.

Figure 15:
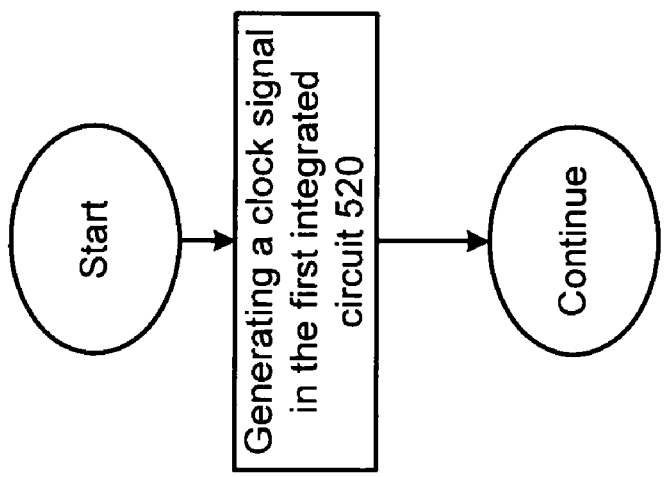
FIG. 15 presents a flowchart representation of a method in accordance with an embodiment of the present invention.

FIG. 15 presents a flowchart representation of a method in accordance with an embodiment of the present invention. In particular, a method is presented for use in conjunction with the method of FIG. 14. In step 520, a clock signal is generated in the first integrated circuit, wherein step 510 includes coupling the clock signal to the second integrated circuit and wherein the baseband module and the RF module operate based on the clock signal.

Figure 16:
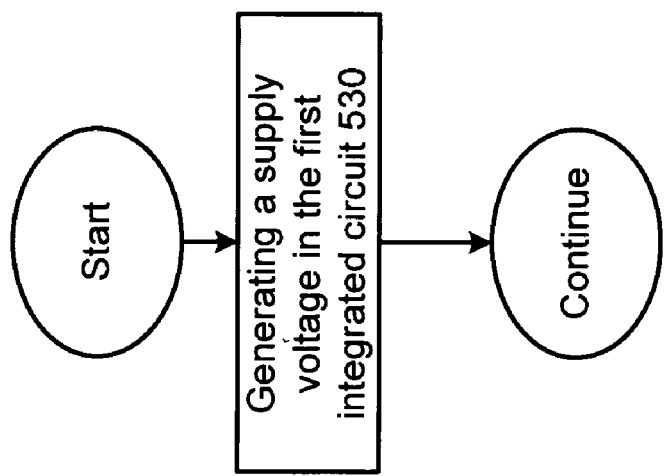
FIG. 16 presents a flowchart representation of a method in accordance with an embodiment of the present invention.

FIG. 16 presents a flowchart representation of a method in accordance with an embodiment of the present invention. In particular, a method is presented for use in conjunction with the method of FIG. 14. In step 530, a supply voltage is generated in the first integrated circuit, wherein step 510 includes coupling the supply voltage to the second integrated circuit and wherein the baseband module and the RF module operate based on the supply voltage.

Figure 17:
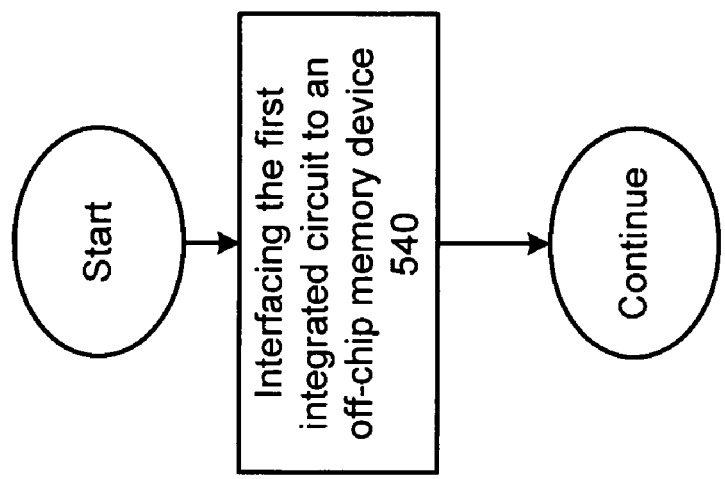
FIG. 17 presents a flowchart representation of a method in accordance with an embodiment of the present invention.

FIG. 17 presents a flowchart representation of a method in accordance with an embodiment of the present invention. In particular, a method is presented for use in conjunction with the method of FIG. 14. In step 540, the first integrated circuit is interfaced to an off-chip memory device.

While the description above has set forth several different modes of operation, the wireless handset 150 may simultaneously be in two or more of these modes, unless, by their nature, these modes necessarily cannot be implemented simultaneously.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology and can include one or more system on a chip integrated circuits that implement any combination of the devices, modules, submodules and other functional components presented herein. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a wireless handset. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. An apparatus, comprising:
   a long range transceiver;
   a first short range transceiver; and
   a second short range transceiver to communicate with a host device, the apparatus operable in a host-connected mode to function as an extended memory of the host device, and wherein the second short range transceiver comprises:
      a first integrated circuit that includes a memory module that stores a plurality of operational instructions for implementing a plurality of protocol layers of a Bluetooth protocol, a processing module that executes the plurality of operational instructions, and a first interface module; and
      a second integrated circuit, wherein the second integrated circuit does not include a dedicated processor, wherein the second integrated circuit includes a second interface module that couples data to and from the first interface module, a radio frequency (RF) module that modulates a first baseband signal to produce a transmitted RF signal, and that demodulates a received RF signal to produce a second baseband signal, and a baseband module that generates the first baseband signal based on data received from the first interface module via the second interface module, and that generates data based on the second baseband signal to send to the first interface module via the second interface module.

2. The apparatus of claim 1, wherein the first interface module operates in a master mode and the second interface module operates as a slave to the first interface module.

3. The apparatus of claim 1, wherein the plurality of protocol layers include a plurality of upper stack layers of the Bluetooth protocol and a plurality of lower stack layers of the Bluetooth protocol that are implemented on the first integrated circuit.

4. The apparatus of claim 1, wherein the first integrated circuit further comprises:
   a direct memory access module that controls communication of data between the first integrated circuit and the second integrated circuit.

5. The apparatus of claim 1, wherein the first interface module and the second interface module communicate data via a serial communication path and wherein at least one of the first interface module and the second interface module include a synchronous receiver transmitter.

6. The apparatus of claim 1, wherein the first integrated circuit further includes:
   an oscillator module for producing a clock signal;
   wherein the first interface module couples the clock signal to the second interface module and wherein the baseband module and the RF module operate based on the clock signal.

7. The apparatus of claim 1, wherein the first integrated circuit further includes:
 a DC to DC converter for producing a supply voltage;
 wherein the first interface module couples the supply voltage to the second interface module and wherein the baseband module and the RF module operate based on the supply voltage.

8. The apparatus of claim 7, wherein the second integrated circuit generates at least one additional supply voltage based on the supply voltage.

9. The apparatus of claim 1, wherein at least a portion of the RF module and the baseband module are implemented using a state machine.

10. The apparatus of claim 1, wherein the memory module includes a random access memory.

11. The apparatus of claim 1, wherein the first integrated circuit further includes:
 a memory interface for interfacing to an off-chip memory device.

12. The apparatus of claim 1, wherein the second integrated circuit further includes:
 an oscillator module for producing a clock signal;
 wherein the second interface module couples the clock signal to the first interface module and wherein the processing module operates based on the clock signal.

13. A wireless handset, comprising:
 a long range transceiver to communicate with a long range wireless communication network;
 a first short range transceiver to communicate with a short range wireless communication network; and
 a second short range transceiver to communicate with a host device, the wireless handset operable in a host-connected mode to function as an extended memory of the host device, the second short range transceiver comprising:
  a first integrated circuit that includes a memory module that stores a plurality of operational instructions for implementing a plurality of protocol layers of a wireless protocol, a processing module that executes the plurality of operational instructions, and a first interface module; and
  a second integrated circuit, wherein the second integrated circuit does not include a dedicated processor, wherein the second integrated circuit includes a second interface module that couples data to and from the first interface module, a radio frequency (RF) module that modulates a first baseband signal to produce a transmitted RF signal, and that demodulates a received RF signal to produce a second baseband signal, and a baseband module that generates the first baseband signal based on data received from the first interface module via the second interface module, and that generates data based on the second baseband signal to send to the first interface module via the second interface module.

14. The wireless handset of claim 13, wherein the first integrated circuit further comprises:
 a direct memory access module that controls communication of data between the first integrated circuit and the second integrated circuit.

15. The wireless handset of claim 13, wherein the first interface module and the second interface module communicate data between the first integrated circuit and the second integrated circuit via a serial communication path and wherein at least one of the first interface module and the second interface module include a synchronous receiver transmitter.

16. The wireless handset of claim 13, wherein the first integrated circuit further includes:
 an oscillator module for producing a clock signal;
 wherein the first interface module couples the clock signal to the second interface module and wherein the baseband module and the RF module operate based on the clock signal.

17. The wireless handset of claim 13, wherein the first integrated circuit further includes:
 a DC to DC converter for producing a supply voltage;
 wherein the first interface module couples the supply voltage to the second interface module and wherein the baseband module and the RF module operate based on the supply voltage.

18. The wireless handset of claim 17, wherein the second integrated circuit generates at least one additional supply voltage based on the supply voltage.

19. The wireless handset of claim 13, wherein at least a portion of the RF module and the baseband module are implemented using a state machine.

20. The wireless handset of claim 13, wherein the memory module includes a random access memory.

21. The wireless handset of claim 13, wherein the first integrated circuit further includes:
 a memory interface for interfacing to an off-chip memory device.

22. The wireless handset of claim 13, wherein the first interface module operates in a master mode and the second interface module operates as a slave to the first interface module.

23. The wireless handset of claim 13, wherein the second integrated circuit further includes:
 an oscillator module for producing a clock signal;
 wherein the second interface module couples the clock signal to the first interface module and wherein the processing module operates based on the clock signal.

24. A method, comprising:
 communicating with a long range wireless communication network via a long range transceiver at a mobile communication device;
 communicating with a short range wireless communication network via a first short range transceiver at the mobile communication device;
 communicating with a host device via a second short range transceiver at the mobile communication device, the mobile communication device operable in a host-connected mode to function as an extended memory of the host device, and wherein the second short range transceiver comprises:
  a first integrated circuit that includes a memory module that stores a plurality of operational instructions for implementing a plurality of protocol layers of a Bluetooth protocol, and a processing module that executes the plurality of operational instructions; and
  bi-directionally communicating data between the first integrated circuit and a second integrated circuit, wherein the second integrated circuit does not include a dedicated processor, the second integrated circuit including a radio frequency (RF) module that modulates a first baseband signal to produce a transmitted RF signal, and that demodulates a received RF signal to produce a second baseband signal, and a baseband module that generates the first baseband signal based on data received from the first integrated circuit, and that generates data based on the second baseband signal to send to the first integrated circuit.

25. The method of claim 24, wherein bi-directionally communicating the data includes controlling communication of the data between the first integrated circuit and the second integrated circuit via direct memory access.

26. The method of claim 24, wherein the data is communicated between the first integrated circuit and the second integrated circuit via a serial communication path.

27. The method of claim 24, further comprising:
generating a clock signal in the first integrated circuit; and
coupling the clock signal to the second integrated circuit, wherein the baseband module and the RF module operate based on the clock signal.

28. The method of claim 24, further comprising:
generating a supply voltage in the first integrated circuit; and
coupling the supply voltage to the second integrated circuit wherein the baseband module and the RF module operate based on the supply voltage.

29. The method of claim 28, further comprising:
generating an additional supply voltage in the second integrated circuit from the supply voltage.

30. The method of claim 24, wherein the first integrated circuit is configured to communicate with an off-chip memory device.

31. The apparatus of claim 1, integrated within a mobile communication device, and wherein the mobile communication device exits the host-connected mode in response to detecting a disconnection of the host device.

32. The method of claim 24, wherein the mobile communication device exits the host-connected mode in response to detecting a disconnection of the host device.

* * * * *